C. B. SAUNDERS.
BEE FEEDER.
APPLICATION FILED AUG. 22, 1917.
1,251,583.
Patented Jan. 1, 1918.
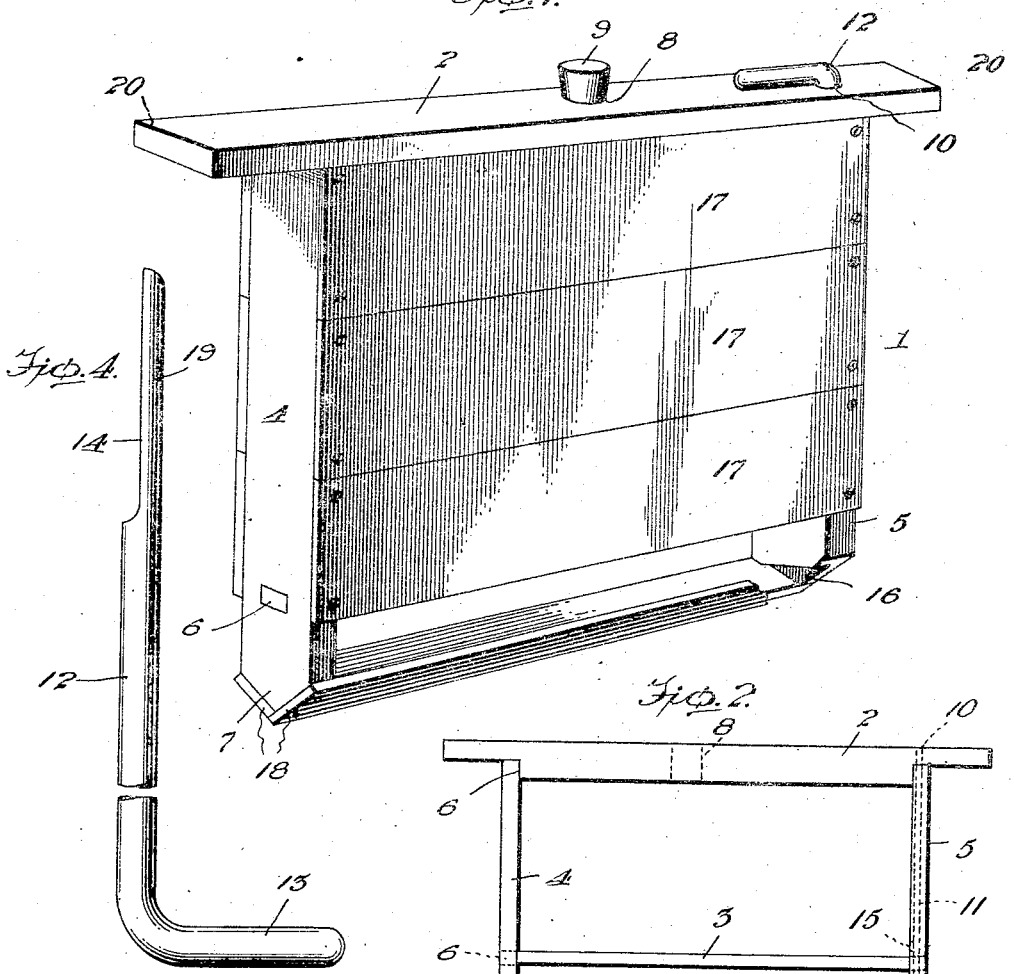
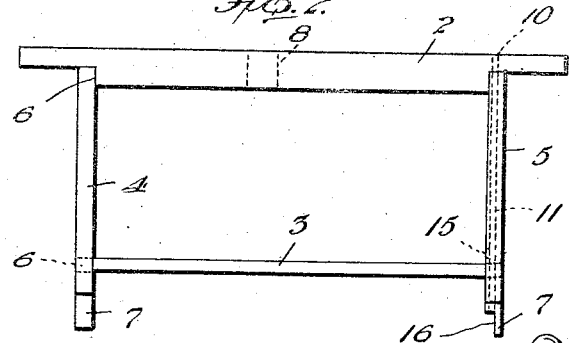
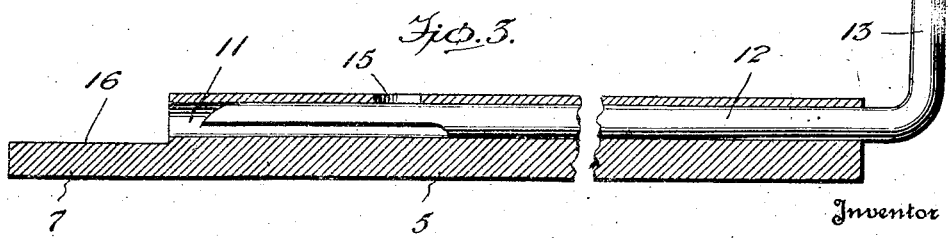
Inventor
Charles B. Saunders
By Edwin Bro's
Attorneys

UNITED STATES PATENT OFFICE.

CHARLES BOONE SAUNDERS, OF BARRINGTON, ILLINOIS.

BEE-FEEDER.

1,251,583.   Specification of Letters Patent.   Patented Jan. 1, 1918.

Application filed August 22, 1917. Serial No. 187,613.

*To all whom it may concern:*

Be it known that I, CHARLES BOONE SAUNDERS, a citizen of the United States, residing at Barrington, in the county of Cook and State of Illinois, have invented certain new and useful Improvements in Bee-Feeders; and I do hereby declare the following to be a full, clear, and exact description of the invention, such as will enable others skilled in the art to which it appertains to make and use the same.

This invention is a bee feeding device and relates more particularly to that type of feeder that is designed to be positioned within the hive or bee-box.

It has for its object the provision of means for the safe, economical and efficient distribution of food to bees and is particularly adapted for use during the winter season when the bees are confined to the hive because of severe weather conditions and the lack of natural sources of nourishment.

With this and other objects in view that may become more apparent from the following description, the invention contemplates the provision of a suitable frame provided with means to support the same within a bee-box in a manner similar to a brood frame. The frame is further provided with a suitable reservoir and feed trough with means for controlling the transmission of fluid from the reservoir to the trough, said trough being so constructed as to substantially preclude the possibility of the bees being drowned while feeding.

One embodiment of the invention is hereinafter fully described, illustrated in the accompanying drawings and more particularly pointed out in the appended claims; it being understood that the drawings are for purposes of illustration only and not as defining the scope of or limiting the invention. The right is reserved to make such changes in size and proportion of parts or in minor details of construction as fairly fall within the scope of the appended claims without departing from or sacrificing any of the advantages of the invention.

In the accompanying drawings:—

Figure 1 is a side elevation of the feeder with a portion of the trough broken away.

Fig. 2 is a detailed view of the frame with the sides removed.

Fig. 3 is a sectional view of the valved end section of the frame.

Fig. 4 is a detailed view of the valve rod.

Like reference numerals are used to designate like parts throughout.

In the embodiment of the invention disclosed in the accompanying drawings, 1 designates the feeder which is shown constructed on the general plan of a brood frame. The feeder may be constructed of any suitable material such as metal or wood, the latter being preferred as the device then resembles more closely the ordinary brood frames with which it is assembled in the hive.

In the preferred form of construction the frame of the feeder may be composed of top and bottom sections 2 and 3 respectively and end sections 4 and 5. The top, bottom and end sections may be joined by suitable mortise joints as indicated at 6, to form the substantially rectangular frame shown in Fig. 2.

The end sections 4 and 5 may extend a suitable distance beyond the bottom section 3, and may terminate in pointed extremities shown at 7. The top section 2 of the feeder is shown provided with a cylindrical aperture 8 extending vertically through the section from the outer to the inner face thereof. A suitable plug or stopper 9 may be provided to close this aperture when desired. The top section 2 may be further provided with a second aperture 10, extending vertically therethrough adjacent one extremity thereof and adapted to coincide with the cylindrical duct 11, of the end section 5. As shown in Fig. 3 the end section 5, may be provided with the cylindrical duct 11 extending longitudinally thereof from end to end.

The duct 11 and aperture 10 are designed to receive a valve rod 12, best shown in Fig. 4. This rod may be made of any suitable material, such as non-corrosive metal, and is preferably cylindrical in form and provided with a hooked end 13 in the form of a handle. The rod is of a diameter substantially equal to that of the duct 11 and may have a portion of its lower extremity cut away as shown at 14, said section to be hereinafter referred to.

The end section 5 is shown provided with a transverse passage way 15 positioned immediately adjacent the inner face of the bottom section 3, and communicating with the duct 11. The cut out portion 14 of the rod 12 may be of sufficient extent as to coincide with the passage 15 when the rod is mounted within the frame as shown in Fig. 1. The pointed extremity 7 of the end section 5 may have a portion thereof removed from its inner face as shown at 16 in Fig. 2, said cut out portion to be hereinafter referred to.

The reservoir or storage tank for the fluid designed to be fed to the bee, may be formed by applying the side boards 17 to the frame as shown in Fig. 1. The boards 17 may be made in one piece or in sections as desired, and may be removably attached to the frame for the purpose of providing means for cleansing the interior of the feeder. It is to be understood that the aperture 8 in the top section 2 is for the purpose of replenishing the supply of fluid in the tank when the same has become exhausted.

The feed trough may be formed by attaching to the beveled edges of the ends 7 of the sections 4 and 5 suitable plates 18 which may be of any suitable material, but are in the preferred form of the invention, made of wood. It is evident that, owing to the pointed ends of the sections 4 and 5, the plates 18 will form a substantially V-shaped trough as shown in Fig. 1. It is to be understood that the ends of sections 4 and 5 extend beyond the bottom 3 sufficiently to allow a suitable space between it and the plates 18 for the entrance of the bees to the trough.

From the disclosures in Figs. 1 and 2 it will be understood that the cut out portion 16 at the end of the section 5 is to provide a free passage for the fluid when the valve rod is turned so as to bring its cut out portion 14 in coincidence with the transverse passage 15, thus permitting the fluid to flow from the reservoir into the trough. By turning the valve rod so as to bring its full face 19 in coincidence with the passage, the flow of fluid into the trough is effectively stopped.

As hereinbefore set forth, the feeder is designed to be supported in a bee-box in a manner similar to a brood frame and, to this end, the top section 2 of the frame may be provided with extended lugs 20, said lugs designed to engage the usual supporting frame within the bee-box.

In operation, the feeder is suspended within the bee-box similarly to a brood frame, and the valve rod turned so as to permit fluid to pass from the reservoir into the trough. When a sufficient quantity of the liquid food has passed into the trough the valve may be completely closed or, if desired, may be partially closed allowing a small stream of the fluid to trickle down the valve rod and into the trough to compensate for the fluid being consumed by the bees. It will be seen that the shallow, V-shaped trough being long and narrow provides ample space for numerous bees to feed simultaneously, at the same time substantially precluding the possibility of the bees being drowned while feeding.

From the foregoing description, taken in connection with accompanying drawings it will be seen that a bee feeder has been produced that is simple and cheap in manufacture, safe and economical in use and one that may be mounted in a bee-box in a manner similar to an ordinary brood frame.

Having thus described the invention, what is claimed as new is:—

1. A bee feeder comprising a frame, a reservoir formed therein, a feeding trough below the reservoir, a duct formed in the end of said frame connecting the reservoir with the trough and a valve to control the duct.

2. A bee feeder comprising a frame, a reservoir formed therein, means to admit fluid thereto, a trough, and means controlled exteriorly of the frame to admit fluid to the trough from the reservoir.

3. A bee feeder comprising a frame, a reservoir formed therein, a trough beneath the reservoir, a longitudinal duct in the end of the frame communicating with the trough, a transverse passage connecting the reservoir with the duct and a valve to control the flow of fluid from the reservoir to the trough.

4. The combination with a brood frame having a fluid reservoir formed therein, of a trough, and means to admit the fluid under control to the trough.

5. The combination with a brood frame having a reservoir formed therein, of a feed trough suspended therefrom, a passage in the end of the frame communicating with the reservoir and the trough, and a valve to control said passage.

6. The combination of a brood frame having a fluid reservoir and a feed trough formed therein, means to admit fluid from the reservoir to the trough, and means carried by the frame to control said admission.

In testimony whereof I affix my signature.

CHARLES BOONE SAUNDERS.